July 1, 1941.  L. KAMENAROVIC  2,247,843

CONDUIT COUPLING

Filed April 5, 1940

Inventor
L. Kamenarovic
By
C. F. Wenderoth
Attorney.

Patented July 1, 1941

2,247,843

UNITED STATES PATENT OFFICE 2,247,843

CONDUIT COUPLING

Leone Kamenarović, Milan, Italy, assignor to Fabbrica Italiana Magneti Marelli Società Anonima, Milan, Italy, a corporation of Italy Application April 5, 1940, Serial No. 328,105
In Italy January 18, 1937

3 Claims. (Cl. 246—168)

Couplings for conduits located on vehicles, particularly in connection with fluid pressure brakes on tractor and trailed vehicles in road trains and the like are known, in which means are provided for the automatic release of the coupling members at the time a pull over a certain range is operative thereon and it is known to provide such coupled vehicles with an indicator and means controlling it and made operative by the separation of said vehicles to give a warning to the train driver as to such an occurrence.

This invention has for its object a plunger switch adapted for being embodied in couplings of the above stated class and cooperating with the coupling clamping means to energise the circuit of an electric indicator at the time said clamping means are moved on the coupling members releasing each other.

Figure 1:
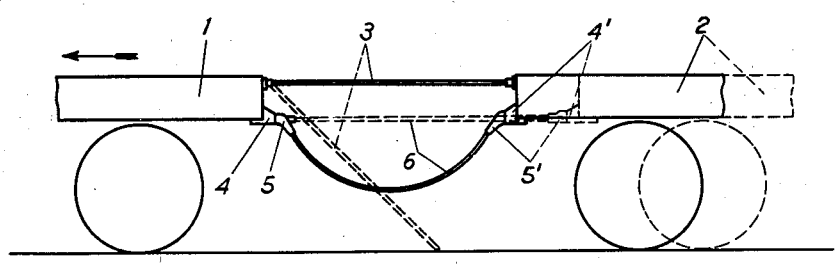
Figure 2:
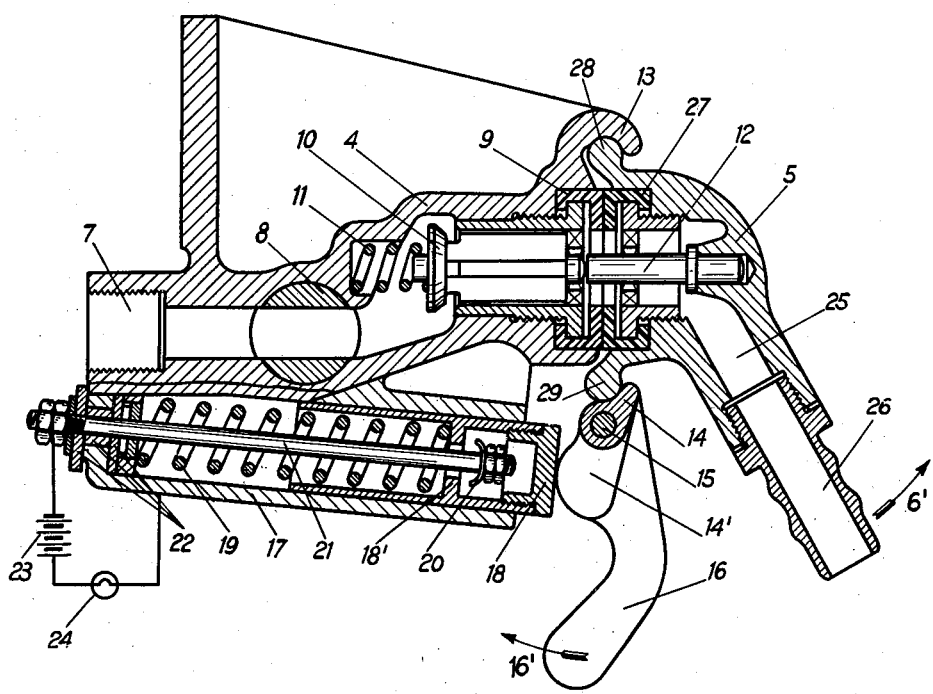

An embodiment of this invention is shown by way of example on the annexed drawing and Fig. 1 is a diagrammatic fragmentary view of adjacent portions of a tractor and a trailed vehicle having conduits coupled by means of couplings of the class to which this invention is directed, and Fig. 2 is a central vertical section to an enlarged scale of a coupling in which a plunger switch of this invention is embodied.

As illustrated in Fig. 1, the opposite adjacent ends of the frames 1 and 2 of the tractor and trailed vehicles are interconnected by a draw bar or coupler 3 and on said frame ends are located the conduit coupling stationary members 4, 4'; a releasable coupling head 5, 5' is engaged with each of said stationary members 4, 4' respectively and said heads 5, 5' are interconnected by means of a flexible hose 6 intended to connect the pressure fluid systems of the tractor and trailed vehicle.

As shown more particularly in Fig. 2, the stationary coupling member 4 provides a duct 7 controlled by a valve 8 adapted to be actuated by a suitable handle (not shown), said duct having a seal ring 9 at its outlet and also an automatic valve 10 which is biased by a spring 11 in its cut-off position; said valve 10 is adapted to be held in open position when normal conditions of operation exist, by a cooperating finger 12 of the respective separable coupling head 5, 5'.

The stationary coupling member 4 further includes at its top a hook or hinge seat 13; at the bottom of said member 4 a pawl 14 is pivoted by means of a transverse spindle 15 fast in the member 4, said pawl 14 being integral with a head 14' and a handle 16.

In a cylindrical chamber 17 integral with the member 4 is mounted to reciprocate a plunger 18 which belongs to a switch, hereinafter described, controlling a circuit of an indicator to give a warning when the coupled vehicles happen to be disconnected from each other; said plunger 18 is loaded by a spring 19 and acts on the head 14' of the pawl 14.

The indicator controlling switch includes a contact member 20 carried by a stem 21 fast in the chamber 17 and insulated therefrom by means of insulating parts 22, as well as a second contact member provided by an inward collar 18' of the plunger 18 which is spaced from the stem 21; said collar 18' is held spaced from the contact member 20 when the plunger 18 is held by the head 14' and pawl 14 in the position illustrated in Fig. 2 due to the engagement of pawl 14 with the separable head 5 at the time this head is coupled with the coupling member 4; on the contrary said collar 18' engages the contact member 20 at the time the head 5 is removed from the member 4 and releases the pawl 14 as hereinafter described.

The indicator circuit includes a suitable source of electric current shown at 23 and an indicator 24, as an electric lamp; said circuit has one end connected with the stem 21 and its other end connected with the coupling member 4, chamber 17 and plunger 18 as illustrated diagrammatically in Fig. 2.

The separable coupling head 5 has a duct 25 adapted to be connected with the duct 7 of the stationary member 4; said head 5 also carries a connector 26 extending from its duct 25 and intended to have one end of the hose 6 attached thereto; the opposite end of the hose 6 is attached to the head 5' intended for cooperation with the coupling member 4' fast on the frame of the associate vehicle, as shown in Fig. 1.

The head 5 includes a seal ring 27 adapted to cooperate with the similar ring 9 of the stationary member 4 and also the finger 12 operative on the valve 10 of the stationary member 4 to hold it in open position so long as the member 4 and the head 5 are intercoupled as shown in Figure 2 and as above stated.

Finally the separable coupling head 5 has a rounded knob 28 adapted to provide a releasable hinge engagement with the hook or seat 13 of member 4 as well as a nose 29 adapted for engagement with the pawl 14.

As above described and as illustrated, the interengaging means 13, 28 and 29, 14 respectively, are located on opposite edges of the faces of member 4 and seat 5 which abut on and interengage with each other, and the connector 26 extends along a line inclined to the planes of said faces and passing substantially through the point of interengagement of the knob 28 in the hook seat 13 said point being the centre of possible respective oscillation of the member 4 and head 5.

Assuming the coupling member 4 and head 5 to be in disconnected condition and to be desired to interengage them, an operator acts on the handle 16 clockwise in the direction of the arrow 16' in Fig. 2 to remove the pawl 14 from way and holds said handle and pawl in such position; subsequently he affixes the head 5 on the stationary member 4 by firstly engaging the knob 28 thereof in the hook 13 of member 4 and thereafter by causing said head 5 to oscillate around the abutment point of knob 28 in hook 13 until the ring 27 is caused to rest frontally on the ring 9 of member 4, the finger 12 at this time engaging the valve 10 and opening it; thereafter the operator releases the handle 16 and then the pawl 14 swings anticlockwise around its spindle 15 under the action of plunger 18 and spring 19 and engages the nose 29 of head 5 to clamp this head 5 over the stationary member 4 in the illustrated position, the collar 18' of the plunger 18 being held removed from the contact blade 20.

When the two vehicles 1 and 2 are connected by a draw bar or coupler 3 as above described and as illustrated in full lines in Fig. 1, the member 4 and the head 5 of the described coupling remain in the illustrated engaged conditions when the trailed vehicle is driven by the tractor by the intermediate of the draw bar 3, the removable head 5 being not stressed in the direction of its release by the coupling hose 6 because in the assumed conditions the said hose is freely depending from the respective end connectors 26 as illustrated in full lines in Fig. 1, and its weight has no action to cause the heads 5, 5' to oscillate around the coupling hinge means 13, 28 of the respective member 1 or 1' for release, on account of the above described location of the line of action of said hose 6 and connector 26 with respect to said hinge means 13, 38.

Should the draw bar or coupler 3 fail during the travel as shown in dotted lines in Fig. 1 and the distance intermediate the vehicles 1 and 2 tend to increase due to the fact that the tractor 1 is further riding forward while the trailed vehicle 2 tends to come to rest, the hose 6 takes a stretched configuration as illustrated in dotted lines in Fig. 1 and it acts on either of heads 5, 5' connected therewith, say on the head 5 to cause it to oscillate in the direction of the arrow 6' in Fig. 2 around the point of engagement of the knob 28 in the hook seat 13 of the member 4 fast on the frame of the vehicle 1; under this action the nose 29 acts on the pawl 14 and causes it to oscillate clockwise around the spindle 15 it is pivoted on and to overcome the action of spring 19 and plunger 18 thereon; said nose 29 is thus caused to be released from the pawl 14 and thereafter the knob 28 moves off from the hook 13 the head 5 being thus free to fall down from member 4 to secure the release of the coupling member 4 and head 5 and of the vehicles; the valve 10 closes under the action of its spring 11 as soon as it has been released by the finger 12 fast in the head 5.

At such time the indicator circuit switch 18', 20 is made operative because the plunger 18 moves under the action of the cooperating spring 19 and the collar 18' thereof engages the contact blade 20 to close the circuit 23, 24 and energize the indicator 24.

The duct 7 may then be finally shut off by the manipulation of the hand valve 8.

What I claim as my invention and desire to secure by United States Letters Patent is:

1. An electrically operative separation signalling apparatus in couplings for vehicle conduits comprising a metal part providing a stationary coupling member, a separable coupling member abutting on said stationary coupling member, interengaging hinge means on said stationary and separable coupling members, a releasable engaging member mounted on said stationary coupling member and operative on said separable coupling member to clamp it on said stationary coupling member, said part providing a chamber opening in register with said engaging member, a hollow conducting plunger reciprocable in said chamber and abutting on said engaging member, a spring in said chamber forcing said plunger against said engaging member, a conducting stem extending in said chamber and hollow plunger and electrically insulated therefrom, an electric signalling device and an electric current source connected in a series circuit across said stem and chamber and plunger, and contact means on said stem and plunger cooperative to control said circuit.

2. An electrically operative separation signalling apparatus in couplings for vehicle conduits comprising a metal part providing a stationary coupling member, a separable coupling member abutting on said stationary coupling member, interengaging hinge means on said stationary and separable coupling members, a releasable engaging member mounted on said stationary coupling member and operative on said separable coupling member to clamp it on said stationary coupling member, said part providing a chamber opening in register with said engaging member, a hollow conducting plunger reciprocable in said chamber and having a head abutting on said engaging member, a spring in said chamber forcing said plunger against said engaging member, a conducting stem extending in said chamber and hollow plunger and electrically insulated therefrom, an electric signalling device and an electric current source connected in a series circuit across said stem and chamber and plunger, an inwardly projecting collar in said hollow plunger at a distance from said abutting head thereof and a resilient contact disk mounted at the end of said stem in the space between said head and collar, said disk and collar cooperating together to control said circuit.

3. An electrically operative separation signalling apparatus in couplings for vehicle conduits comprising a metal part providing a stationary coupling member, a separable coupling member abutting on said stationary coupling member, interengaging hinge means on said stationary and separable coupling members, a releasable engaging member mounted on said stationary coupling member and operative on said separable coupling member to clamp it on said stationary coupling member, said part providing a chamber having a bottom at one end and opening at its other end in register with said engaging member, a hollow conducting plunger reciprocable in said chamber and abutting on said engaging member, a spring in said chamber forcing said plunger against said engaging member, a conducting stem extending in said chamber and hollow plunger, said stem being secured in said chamber bottom and electrically insulated therefrom, an electric signalling device and an electric current source having its terminals connected with said stem and said chamber and plunger through said electric signalling device, and contact means on said stem and plunger cooperative to control the circuit of said source and signalling means.

LEONE KAMENAROVIĆ.